No. 897,880. PATENTED SEPT. 8, 1908.
J. S. CUSHING.
WHEEL TIRE.
APPLICATION FILED FEB. 8, 1906.

Witnesses:
Cynthia Doyle
H. B. Davis

Inventor:
Josiah S. Cushing.
by Hayes & Harriman,
Attys.

UNITED STATES PATENT OFFICE.

JOSIAH S. CUSHING, OF NORWOOD, MASSACHUSETTS.

WHEEL-TIRE.

No. 897,880.

Specification of Letters Patent.

Patented Sept. 8, 1908.

Application filed February 8, 1906. Serial No. 300,036.

*To all whom it may concern:*

Be it known that I, JOSIAH S. CUSHING, of Norwood, county of Norfolk, State of Massachusetts, have invented an Improvement in Wheel-Tires, of which the following description, in connection with the accompanying drawings, is a specification, like characters on the drawings representing like parts.

This invention relates to wheel tires, and has for its object to improve the construction of the same to the end that the portions of the tires which are out of contact with the ground may be utilized to support the load and to absorb the vibrations, and the tread portions of the tires, and also the means employed for transmitting thereto the weight of the load will be held against lateral displacement and will be radially guided in all the different positions the tire and the transmitting means may occupy with respect to the felly.

Figure 1:
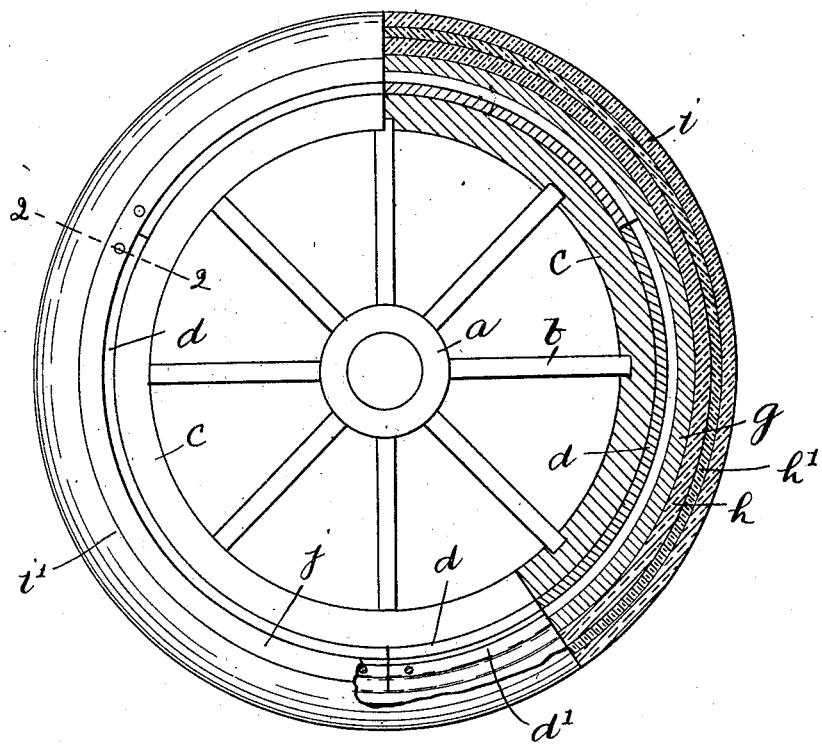
Figure 2:
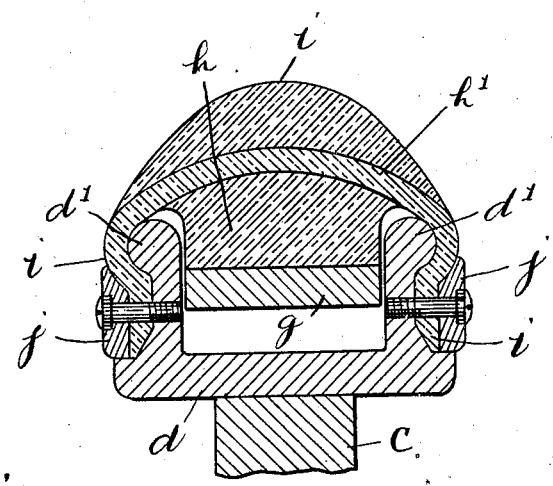

Figure 1 shows in side elevation and partial section a wheel tire embodying this invention. Fig. 2 is an enlarged cross section of a portion of the wheel tire shown in Fig. 1, taken on the dotted line 2—2.

As illustrating one practical embodiment of my invention *a* represents the hub of the wheel; *b* the spokes and *c* the rim, which is secured to the spokes. A flanged ring is secured to the rim *c* by screws or otherwise, which is made much wider than the rim. This ring is composed of a base *d* and a pair of side flanges *d'* extended radially outward therefrom. This ring may, and preferably will be made in sections, three sections being herein shown. The flanged ring and rim upon which it is mounted, as herein shown, constitute the felly of the wheel, and the flanges constitute vertical guiding-means which extend continuously therearound.

The tire is composed essentially of a circular strip or band *h*, an outer covering or inclosing strip thereon comprising an intermediate layer or portion *h'*, a tread portion *i*, and two flexible side portions *i'*, *i'*, the latter extending laterally and inwardly from the intermediate portion *h'*. The elements thus composing the tire are or may be made of different qualities of rubber, with or without the interposition of textile material, as usual in the manufacture of wheel tires, and they are preferably all vulcanized together. The portion *h* of the tire is made of a width to enter between the side flanges of the felly and of a thickness to extend inward between said flanges for a considerable distance and also to project a short distance beyond said flanges, and the flexible side portions are extended from the intermediate layer or portion of the tire laterally over the edges of said flanges and then inwardly, in a radial direction, on the outside of said flanges. The edges of the flexible side portions of the tire are secured to the felly, as for instance, to the side flanges, by means of rings *j* which are bolted or otherwise secured thereto.

When the parts are assembled the tire presents radially and inwardly extended guiding-means, herein represented by the rib *h*, which extend inwardly beyond and are at all times in sliding engagement with the felly-guiding-means, herein represented by the side flanges, so that the tread portion of the tire is at all times laterally supported and radially guided.

A circular band *g* is contained in the space between the side flanges of the felly. It is made of a lesser diameter than the felly-guiding-means. It is made of suitable thickness to give it the required rigidity and it is made of a width approximately equal to the distance between the side flanges so that it is held from lateral movement by said side flanges. It is made of a diameter sufficiently large to engage the inner face of the portion *h* of the tire and hence is located some little distance from the felly. It is made yielding but not to such an extent as to materially reduce its rigidity. It is made in sections but said sections are subsequently welded or otherwise secured together. When the parts are assembled the band *g* surrounds the felly but at a distance therefrom and engages the interior of the tread portion only of the tire and is laterally supported and radially guided by the felly-guiding-means.

When pressure is applied to the tire, the tire, at the point of contact with the ground, is compressed, and together with the band *g* is moved inward, but such compression and inward movement of the tire and band is yieldingly resisted by the remaining portion of the tire which engages the remaining portion of the band, hence that portion of the tire which is out of contact with the ground serves as a yielding support to resist inward movement of that portion of the tire which is in contact with the ground, and consequently supports the load and absorbs the vibrations. As the tire is pressed inward the flexible side portions, which are extended laterally over the side flanges, are brought to bear more and more upon the outer edges of said side flanges in a direction toward the faces thereof, being thereby prevented from bulging outward. It will be observed that the circular band transmits the weight of the load and the vibrations or shocks incident to the wheel passing over inequalities of the road, to that portion of the tire which is out of contact with the ground, so that the load will be supported and the vibrations or shocks absorbed by such portion of the tire, and that the tread portion of the tire, and also the circular band, will be held against lateral displacement and will be radially guided.

Having thus described my invention, what I claim as new and desire to secure by Letters Patent is:—

1. In a resilient wheel, a felly having vertical guiding-means extending continuously therearound, a flexible tire attached to said felly having radially and inwardly extending guiding-means thereon, said tire-guiding-means extending inwardly beyond and being at all times in sliding engagement with said felly-guiding-means, whereby the tire is radially guided and laterally supported, and a continuous circular band within the tire, surrounding the felly, at a distance therefrom, which transmits the weight of the load to the tread portion only of the tire, substantially as described.

2. In a resilient wheel, a felly having vertical guiding-means extending continuously therearound, a flexible tire attached to said felly having radially and inwardly extending guiding-means thereon, said tire-guiding-means extending inwardly beyond and being at all times in sliding engagement with the said felly-guiding-means, whereby the tire is radially guided and laterally supported, and a continuous circular band within the tire, surrounding the felly, at a distance therefrom, which transmits the weight of the load to the tread portion only of the tire, said circular band being of lesser diameter than the felly-guiding-means and disposed adjacent thereto, whereby t is radially guided and laterally supported, substantially as described.

In testimony whereof, I have signed my name to this specification, in the presence of two subscribing witnesses.

JOSIAH S. CUSHING.

Witnesses:
W. FRED. WIGMORE,
OLIVER J. BARR.